US006724468B2

(12) United States Patent
McAlexander et al.

(10) Patent No.: US 6,724,468 B2
(45) Date of Patent: Apr. 20, 2004

(54) SINGLE SWEEP PHASE SHIFT METHOD AND APPARATUS FOR MEASURING CHROMATIC AND POLARIZATION DEPENDENT DISPERSION

(75) Inventors: William Ian McAlexander, Redwood City, CA (US); Gregory Douglas VanWiggeren, Los Gatos, CA (US)

(73) Assignee: Agilent Technologies, INC, Palo Alto, CA (US)

( * ) Notice: Subject to any disclaimer, the term of this patent is extended or adjusted under 35 U.S.C. 154(b) by 37 days.

(21) Appl. No.: 10/211,018

(22) Filed: Jul. 31, 2002

(65) Prior Publication Data

US 2004/0021864 A1 Feb. 5, 2004

(51) Int. Cl.$^7$ ............................. G01N 21/00; G01J 4/04
(52) U.S. Cl. ....................... 356/73.1; 356/364
(58) Field of Search ................. 356/73.1, 364

(56) References Cited

U.S. PATENT DOCUMENTS

| 5,258,615 | A | * | 11/1993 | Thorley | 356/364 |
| 5,486,919 | A | * | 1/1996 | Tsuji et al. | 356/484 |
| 5,995,228 | A | * | 11/1999 | Otani et al. | 356/364 |
| 6,144,450 | A | | 11/2000 | Jopson et al. | |
| 6,154,273 | A | * | 11/2000 | Suzuki | 356/73.1 |
| 6,433,865 | B1 | * | 8/2002 | Kimura et al. | 356/73.1 |
| 6,459,830 | B1 | * | 10/2002 | Pua et al. | 385/24 |
| 6,519,027 | B1 | * | 2/2003 | Gordon et al. | 356/73.1 |
| 6,573,985 | B2 | * | 6/2003 | Ibukuro et al. | 356/73.1 |
| 2003/0174337 | A1 | * | 9/2003 | VanWiggeren | 356/477 |

OTHER PUBLICATIONS

Williams, P.A., "Modulation Phase–Shift Measurement of PMD using only Four Launched Polarisation States: A New Algorithm", Electronics Letters, vol. 35, No. 18, pp. 1578–1579, Sep., 1999.

Fujise, et al., "Chromatic Dispersion Measurement over a 100 km Dispersion–Shifted Single–Mode Fibre by a New Phase–Shift Technique," KDD Research & Development Laboratories, Mar., 1986.

Heffner, B.L., "Automated Measurement of Polarization Mode Dispersion Using Jones Matrix Eigenanalysis," IEEE Photonics Technology Letters, vol. 4, No. 9, pp. 1066–1069 Sep., 1992.

Costa, et al, "Phase Shift Technique for the Measurement of Chromatic Dispersion in Optical Fibers using LED's,", IEEE Journal of Quantum Electronics, vol. QE–18, No. 10, pp. 1509–1515, Oct., 1982.

Imamura, et al., "Simultaneous and High Resolution Measurement of Polarization Mode Dispersion, Group Delay, Chromatic Dispersion and Amplitude for Ultra–High Speed Optical Components", National Fiber Optic Engineers Conference, 2001 Technical Proceedings, pp. 1348–1352.

Nelson, et al., "Measurement of Polarization Mode Dispersion Vectors using the Polarization–Dependent Signal Delay Method," Optics Express, vol. 6, No. 8, pp. 158–167, Apr., 2000.

* cited by examiner

Primary Examiner—Michael P. Stafira
Assistant Examiner—Juan D Valentin, II

(57) ABSTRACT

A method for determining at least one optical property of an optical device comprises providing an optical input signal that includes first and second signal components that are modulated at first and second frequencies, respectively, and that have first and second polarization states, respectively. The optical input signal is passed to an optical device. An optical output signal from the optical device is separated into first and second output signals that have third and fourth polarization states, respectively. The first and second output signals are each compared with reference signals at the first and second frequencies to provide four phase shift and amplitude measurements that can be used to determine the at least one optical property of the optical device as a function of wavelength.

20 Claims, 3 Drawing Sheets

SINGLE SWEEP PHASE SHIFT METHOD AND APPARATUS FOR MEASURING CHROMATIC AND POLARIZATION DEPENDENT DISPERSION

BACKGROUND OF THE INVENTION

1. Technical Field of the Invention

The present invention relates generally to the optical measurement field More particularly, the invention relates to a method and apparatus for determining chromatic and polarization dependent dispersion and other optical properties of an optical device.

2. Description of Related Art

Chromatic dispersion of an optical communications system can significantly limit the information carrying capacity of an optical signal transmitted through the system. Particularly in an optical communications system that operates at a high bit rate, e. g., 40 Gbps or more, chromatic dispersion can result in pulse distortion and otherwise affect the quality of an optical signal transmitted through the system.

Polarization dependent dispersion, also referred to as polarization-mode dispersion or PMD, can also limit the information carrying capacity of an optical signal in an optical communications system by limiting the bit rates that are achievable in the system. PMD arises because the velocity of propagation of an optical signal through an optical communications system also depends on the polarization state of the optical signal, and the effects of polarization dependent dispersion also become increasingly significant as higher bit rates are achieved.

There is, accordingly, a need for a technique for accurately determining chromatic and polarization dependent dispersion, as well as other optical properties, of an optical device.

SUMMARY OF THE INVENTION

The invention provides a technique for accurately determining chromatic and polarization dependent dispersion and other optical properties of an optical device.

It has been discovered that by passing an optical signal having signal components that are modulated at first and second frequencies, respectively, and that have first and second polarization states, respectively, to an optical device, and then separating an optical output signal from the optical device into first and second output signals that have third and fourth polarization states, respectively (that may be the same as or different from the first and second polarization states), optical properties of the device, such as the chromatic dispersion and the polarization dependent dispersion of the device, can be accurately determined. In particular, by comparing each of the first and second output signals with reference signals at the first and second frequencies, a set of four distinct phase-shift and amplitude measurements as a function of the wavelength of the optical input signal are obtained that spans all possible polarization states and that allows for unique determination of chromatic and polarization dependent dispersion and other optical properties of the optical device. With the present invention, only one sweep of an input optical source over a wavelength range is needed to accurately determine chromatic dispersion, polarization dependent dispersion and other optical properties of an optical device. Accordingly, wavelength repeatability requirements of the optical source are relaxed and measurement time may be reduced. Furthermore, the invention provides embodiments with other features and advantages in addition to or in lieu of those discussed above. Many of these features and advantages are apparent from the description below with reference to the following drawings.

DETAILED DESCRIPTION OF THE EXEMPLARY EMBODIMENTS OF THE INVENTION

Embodiments in accordance with the invention provide a technique for accurately determining chromatic dispersion, polarization dependent dispersion and other optical properties of an optical device. The technique permits a relaxation of wavelength repeatability requirements of an optical source used in the technique and may be completed in a reduced period of time.

Because chromatic dispersion negatively influences the quality of an optical signal carried by an optical communications system, it is important for a designer or a manufacturer of an optical communications system to precisely control the chromatic dispersion of the system. A typical optical communications system is composed of a plurality of separate optical devices, for example, a plurality of spans of optical fiber, and each device may have a different chromatic dispersion. In order to minimize the total chromatic dispersion of the system, it is necessary to compensate for the chromatic dispersion introduced by each device in the system. One technique for minimizing the total chromatic dispersion of an optical communications system is to select devices of differing chromatic dispersion such that the total chromatic dispersion of the system is minimized. Another technique is to allow the chromatic dispersion to accumulate along the system and then compensate for the accumulated chromatic dispersion at the output of the system.

In order to be able to precisely control the total chromatic dispersion of an optical communications system, it is necessary to accurately measure the chromatic dispersion of each device in the system; and various measurement techniques have been developed for this purpose. One technique for measuring chromatic dispersion utilizes the "shift method" (PSM) in which the phase delays at different wavelengths are measured after being passed to an optical device under test, for example, after being passed through a given length of an optical fiber. From these measurements, the chromatic dispersion of the optical device can be determined.

Figure 1:
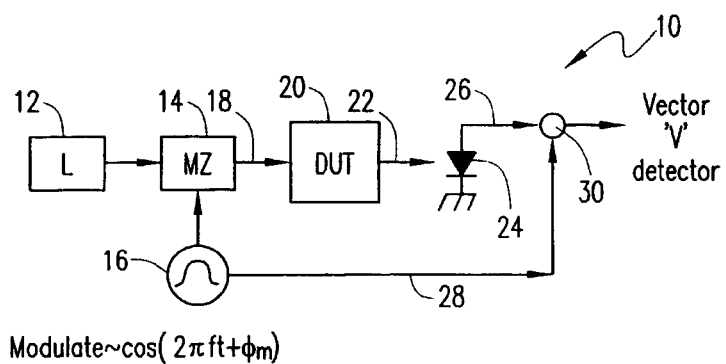
FIG. 1 is a block diagram that schematically illustrates a chromatic dispersion test apparatus for determining chromatic dispersion of an optical device to assist in explaining the present invention.

FIG. 1 is a block diagram that schematically illustrates a chromatic dispersion test apparatus for measuring the chromatic dispersion of an optical device under test (DUT) to assist in explaining the present invention (also see Dennis Derickson, Ed., *Fiber Optic Test and Measurement*, Prentice Hall PTR, New Jersey, Chapter 12, 1998). The apparatus is generally designated by reference number 10, and includes a tunable narrow band optical source such as laser source 12. The light signal from laser source 12 is modulated at a known RF frequency, e.g., $\cos(2\pi ft+\Phi_m)$, by optical modulator 14 driven by RF source 16.

Modulated optical signal 18 from modulator 14 is then input to optical DUT 20. Optical output signal 22 from DUT 20 is modulated at the same frequency as optical signal 18 input to the DUT, however, a wavelength dependent phase shift will have been introduced into the optical output signal as a result of chromatic dispersion present in the DUT.

Optical output signal 22 from DUT 20 is detected and converted to RF output signal 26 by optical-to-electrical converter 24. The shift in phase of RF output signal 26 is then measured by comparing RF output signal 26 to reference RF signal 28 derived from RF source 16 used to drive modulator 14 by RF mixer 30. The output of RF mixer 30 is a wavelength dependent measurement of the phase shift introduced into the optical output signal as a result of chromatic dispersion present in the DUT, and the chromatic dispersion of the DUT can be calculated from measurements at different wavelengths (a minimum of three wavelengths). Specifically, by varying the wavelength of optical source 12, the chromatic dispersion of the DUT as a function of wavelength can be determined.

Although the phase shift method is effective for measuring chromatic dispersion of an optical device, the method does not measure polarization dependent dispersion of the device.

Techniques have been developed for adapting the phase shift method to determine polarization dependent dispersion. Typically, these techniques involve making multiple sweeps of the optical source at different states of polarization so as to determine the polarization dependency of the dispersion. In order to accurately describe both chromatic dispersion and polarization dependent dispersion, a minimum of four measurement sweeps are required.

When an optical source is swept a plurality of times in a measurement procedure, however, it is necessary to ensure that changes in characteristics of the device under test, or of the measurement apparatus, do not occur during the periods between sweeps. For example, care must be taken to maintain a stringent wavelength repeatability for the optical source. In addition, it is important to avoid temperature changes or vibration of the DUT between measurements as these will also affect the accuracy of the measurements. Also, the requirement for multiple sweeps to determine the chromatic and polarization dependent dispersion of an optical device increases the overall time required to complete the determination.

Figure 2:
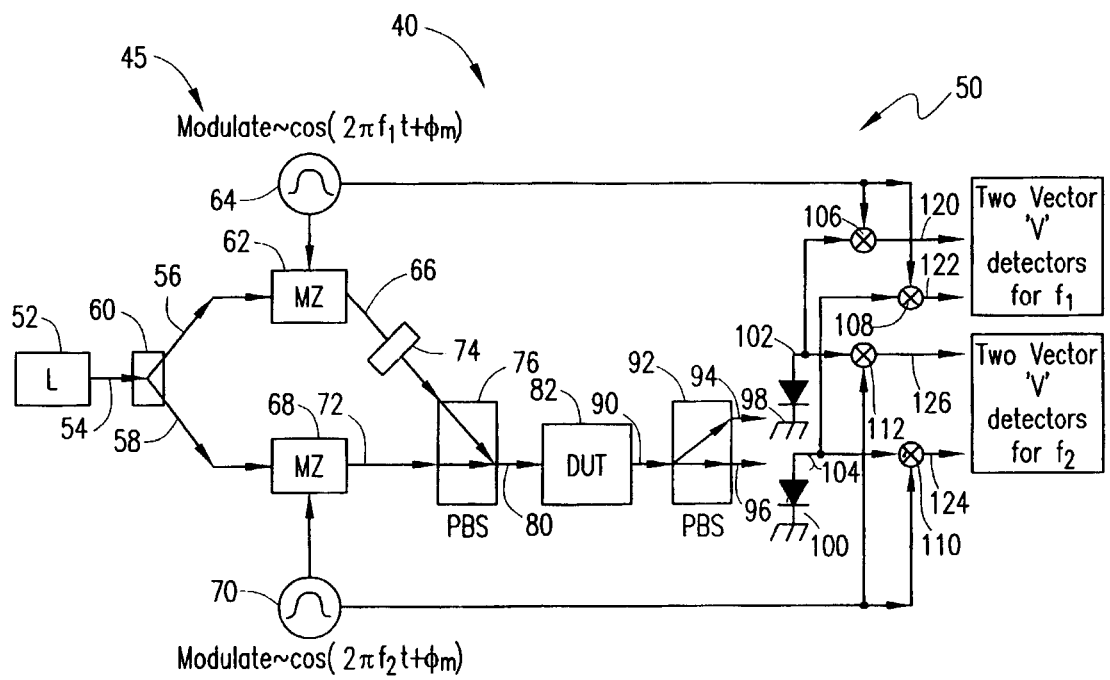
FIG. 2 is a block diagram that schematically illustrates an apparatus for determining chromatic dispersion, polarization dependent dispersion and other optical properties of an optical device according to an embodiment of the present invention.

FIG. 2 is a block diagram that schematically illustrates an apparatus for determining chromatic dispersion, polarization dependent dispersion and other optical properties of an optical device according to an embodiment of the present invention. The apparatus is generally designated by reference number 40 and comprises a transmitter portion, generally designated by reference number 45, and a receiver portion, generally designated by reference number 50. Transmitter portion 45 includes a tunable narrow band optical source, such as laser source 52 that generates optical signal 54. Optical source 52 comprises a tunable optical source by which the wavelength of the optical signal 54 can be controlled. Splitter 60 splits optical signal 54 into first and second optical signals 56 and 58 that travel along separate paths. Optical signal 56 is modulated at a first known RF frequency, e.g., $\cos(2\pi f_1 t+\Phi_m)$, by first optical modulator 62 driven by first RF source 64 to provide first modulated optical signal 66. Optical signal 58 is modulated at a second known RF frequency, e.g., $\cos(2\pi f_2 t+\Phi_m)$, by second optical modulator 68 driven by second RF source 70 to provide second modulated optical signal 72. In an exemplary embodiment of the present invention, optical signals 56 and 58 are intensity modulated although other forms of modulation, such as frequency modulation, can also be performed, if desired.

The polarizations of first and second modulated optical signals 66 and 72 are then adjusted to have first and second polarization states, preferably first and second substantially orthogonal polarization states. This can be achieved in various ways, and is illustrated in FIG. 2 by polarization adjusting device 74 in the path of modulated optical signal 66 to ensure that the first and second modulated optical signals are substantially orthogonal to one another (for example, one polarized in the x direction and one polarized in the y direction).

First and second modulated optical signals 66 and 72 are then combined by polarizing beam splitter (PBS) 76 to provide optical input signal 80 that includes first and second signal components that are modulated at the first and second frequencies, respectively, and that have first and second substantially orthogonal polarization states, respectively. Optical input signal 80 is then directed to optical DUT 82 as shown in FIG. 2.

Receiver portion 50 of apparatus 40 includes polarizing beam splitter 92 that receives optical output signal 90 from DUT 82 and splits optical output signal 90 into first and second optical output signals 94 and 96 having third and fourth polarization states, preferably third and fourth substantially orthogonal polarization states, that may be the same as or different from the first and second polarization states of the optical input signal. First and second optical output signals 94 and 96 are then converted to first and second RF output signals 102 and 104 by optical-to-electrical converters 98 and 100, respectively. Each RF output signal 102 and 104 is then compared to reference signals at the first and second RF frequencies derived from first and second RF sources 64 and 70 used to drive modulators 62 and 68, respectively, by a comparator comprising RF mixers 106, 108, 110 and 112. The output from the comparator comprises four distinct phase shift and amplitude measurements 120, 122, 124 and 126, from which the chromatic dispersion and the polarization dependent dispersion of DUT 82 can be readily determined as a function of wavelength as laser source 52 is tuned to different wavelengths. The chromatic and polarization dependent dispersion can be determined, for example, by using a matrix analysis similar to Jones-Matrix-Eigenanalysis (see B. L. Heffner, *Automated Measurement of Polarization Mode Dispersion Using Jones Matrix Eigenanalysis*, IEEE Photonics Technology Letters, Vol. 4, No. 9, pages 1066–1069, 1992).

By utilizing apparatus 40, only a single sweep of optical source 52 over a wavelength range is needed to provide the four phase shift and amplitude measurements needed to determine chromatic dispersion, polarization dependent dispersion and other optical properties of an optical device. Because only one sweep of the optical source over a wavelength range is needed to complete all necessary measurements, wavelength repeatability requirements of the optical source are eliminated and the over-all process for determining chromatic and polarization dependent dispersion and other optical properties of an optical device may be completed in a reduced period of time.

Figure 3:
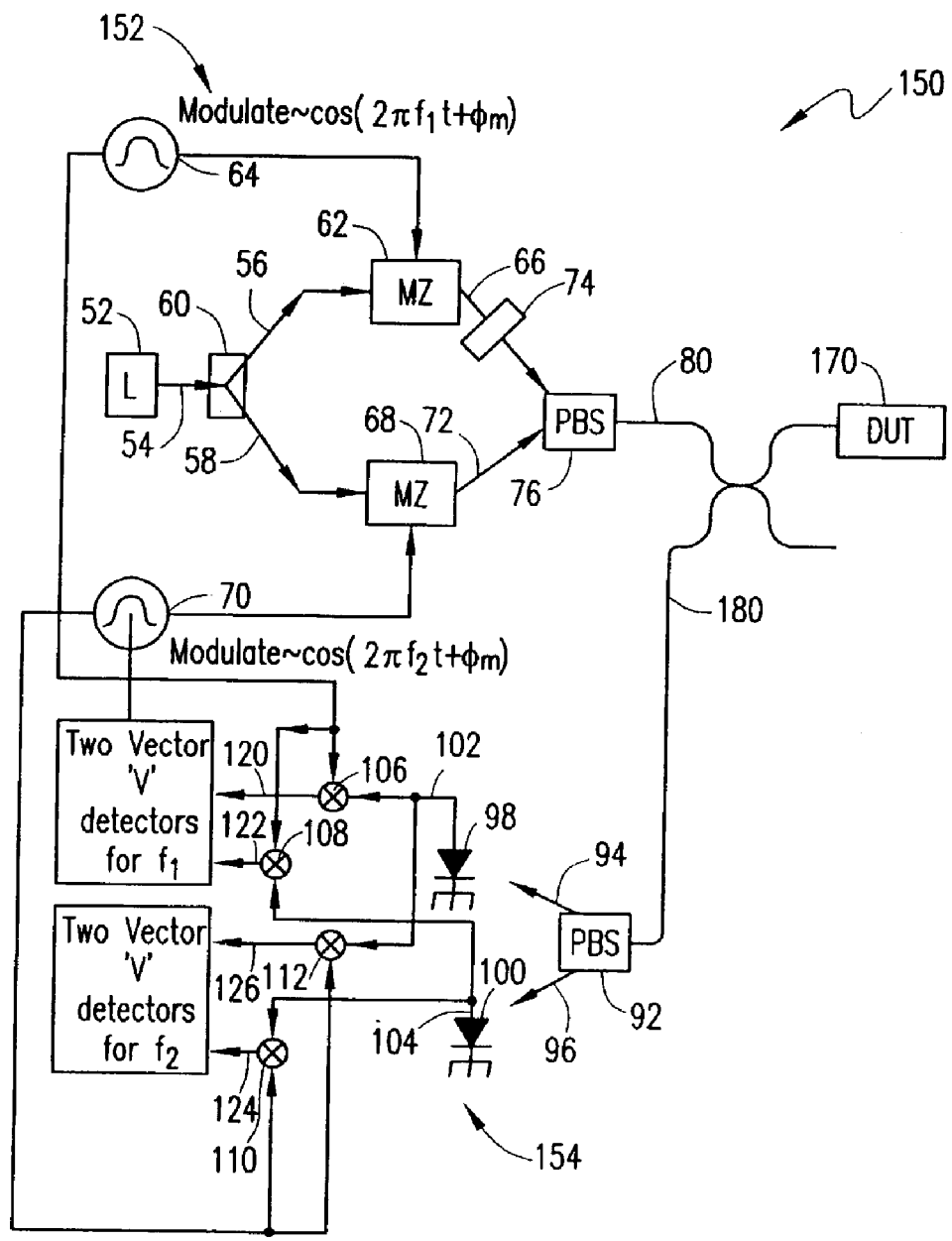
FIG. 3 is a block diagram that schematically illustrates an apparatus for determining chromatic dispersion, polarization dependent dispersion and other optical properties of an optical device according to another embodiment of the present invention.

FIG. 2 illustrates an embodiment in which optical input signal 80 passes through optical DUT 82. The present invention can also be utilized to determine optical properties of a DUT in which light is reflected from the DUT. FIG. 3 is a block diagram that schematically illustrates an apparatus for determining chromatic dispersion, polarization dependent dispersion and other optical properties of an optical device in which light is reflected from a device under test according to another embodiment of the present invention. The apparatus is generally designated by reference number 150, and comprises transmitter portion 152 and receiver portion 154. Transmitter portion 152 and receiver portion 154 are substantially identical to transmitter and receiver portions 45 and 50 in the embodiment illustrated in FIG. 2, and like reference numbers are used to identify like components of the portions.

Apparatus 150 in FIG. 3 differs from apparatus 40 in FIG. 2 in that optical input signal 80 in FIG. 3 is passed to and reflected from DUT 170 to provide optical output signal 180 (the terms "optical input signal" and "optical output signal" as used herein are intended to refer to signals to and from an optical DUT irrespective of the manner in which the optical input signal interacts with the DUT).

As in the embodiment of FIG. 3, the output from the comparator comprises four distinct phase shift and amplitude measurements 120, 122, 124 and 126, from which the chromatic and polarization dependent dispersion of DUT 170 can be readily determined as a function of wavelength as laser source 52 is tuned to different wavelengths.

Figure 4:
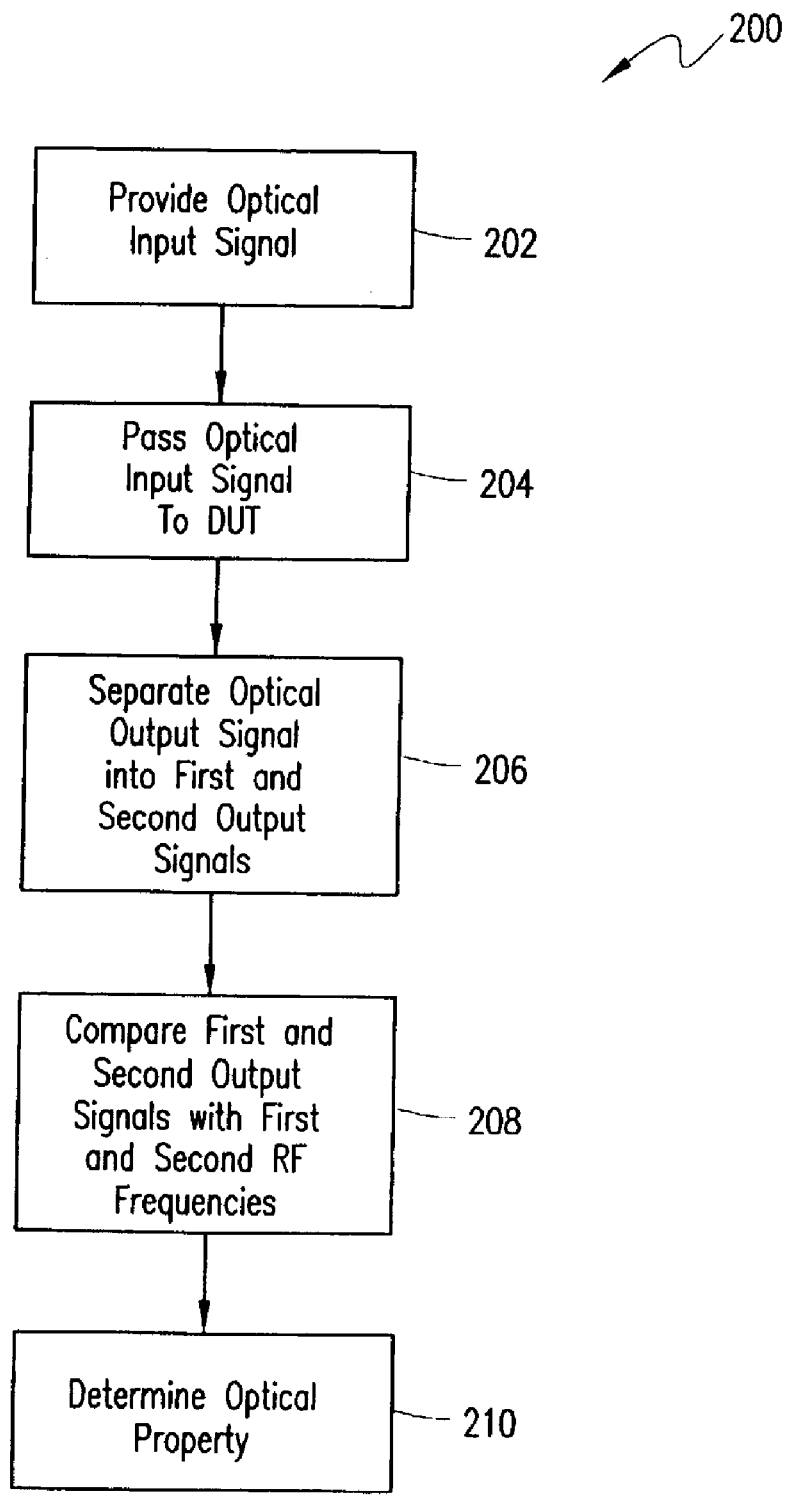
FIG. 4 is a flow chart that illustrates steps of a method for determining an optical property of an optical device according to another embodiment of the present invention.

FIG. 4 is a flow chart that illustrates steps of a method for determining chromatic and polarization dependent dispersion and other optical properties of an optical device according to an embodiment of the present invention. The method is generally designated by reference number 200, and begins by providing an optical input signal having first and second signal components that are modulated at first and second frequencies, respectively, and that have first and second polarization states, respectively (step 202). The optical input signal is then passed to an optical DUT (step 204).

An optical output signal from the optical DUT is then separated into first and second optical output signals having third and fourth polarization states which may be the same as or different from the first and second polarization states, and the first and second optical output signals are converted to first and second RF output signals, respectively (step 206). Each of the first and second RF output signals are then compared with reference signals at the first and second RF frequencies to provide four phase shift and amplitude measurements (step 208). The four phase shift and amplitude measurements as a function of wavelength are then used to determine optical properties of the DUT (step 210).

While what has been described constitutes exemplary embodiments of the present invention, it should be recognized that the invention can be varied in many respects without departing therefrom. For example, although in exemplary embodiments described herein, the invention is primarily directed to determining chromatic dispersion and polarization mode dispersion of an optical device, the invention can also determine other optical properties of an optical device. Exemplary of such other optical properties include insertion loss, transmittance, reflectance, polarization dependent loss, polarization dependent reflectance, group delay and differential group delay. Also, although in exemplary embodiments described herein, the DUT comprises a length of optical fiber, the DUT can comprise any device that propagates, reflects or otherwise interacts with optical signals. Also, although exemplary embodiments use optical fibers to transmit optical signals, the signals can be transmitted via another medium, for example, through free space. Because the invention can be varied in many ways, it should be understood that the invention should be limited only insofar as is required by the scope of the following claims.

We claim:

1. A method for determining at least one optical property of an optical device, comprising:

providing an optical input signal that includes first and second signal components that are modulated at first and second frequencies, respectively, and that have first and second polarization states, respectively;

passing the optical input signal to an optical device, separating an optical signal from the optical device into first and second output signals that have third and fourth polarization states, respectively, and comparing each of said first and second output signals with reference signals at said first and second frequencies to provide four phase shift and amplitude measurements from which the at least one optical property of the optical device can be determined as a function of wavelength of the optical input signal.

2. The method according to claim 1, wherein said step of providing an optical input signal includes:

splitting an optical signal into first and second optical signals; and modulating said first and second optical signals at first and second frequencies, respectively, to provide first and second modulated optical signals.

3. The method according to claim 2, wherein said step of providing an optical input signal further includes adjusting the polarization of said first and second modulated optical signals to be substantially orthogonal to provide first and second modulated optical signals that have first and second substantially orthogonal polarization states, respectively.

4. The method according to claim 3, wherein said step of providing an optical input signal further includes combining said first and second modulated optical signals having said first and second substantially orthogonal polarization states to provide said optical input signal.

5. The method according to claim 1, wherein said separating step includes separating said optical signal from the optical device into first and second optical output signals that have the third and fourth substantially orthogonal polarization states, respectively, and converting said first and second optical output signals to first and second RF output signals, respectively.

6. The method according to claim 5, wherein said comparing step comprises comparing each of said first and second RF output signals with reference signals at first and second RF frequencies.

7. The method according to claim 1, wherein said modulation comprises intensity modulation.

8. The method according to claim 1, wherein said at least one optical property includes, at least one of chromatic dispersion, polarization dependent dispersion, insertion loss, transmittance, reflectance, polarization dependent loss, polarization dependent reflectance, group delay and differential group delay.

9. The method according to claim 1, wherein said passing step comprises either passing said optical input signal through said optical device, or reflecting said optical input signal from said optical device.

10. The method according to claim 8, wherein said chromatic dispersion and said polarization dependent dispersion is determined as a function of the wavelength as said optical input signal is tuned to different wavelengths.

11. The method according to claim 1, wherein said optical input signal is provided by a tunable optical source for controlling wavelength of the optical input signal.

12. Apparatus for determining at least one optical property of an optical device, comprising:
   a transmitter capable of providing an optical input signal to an optical device, said optical input signal including first and second signal components that are modulated at first and second frequencies, respectively, and that have first and second polarization states, respectively; and
   a receiver capable of receiving an optical output signal from the optical device, said receiver including a converter for converting the optical output signal from the optical device into first and second output signals corresponding to third and fourth polarization states, respectively, and a comparator for comparing each of the first and second output signals with reference signals at said first and second frequencies to provide four phase shift and amplitude measurements from which the at least one optical property of the optical device can be determined as a function of wavelength.

13. The apparatus according to claim 12, wherein said transmitter includes:
   a tunable optical source;
   a splitter for splitting an optical signal from said tunable optical source into first and second optical signals;
   first and second modulators for modulating said first and second optical signals at first and second RF frequencies, respectively, to provide first and second modulated optical signals, and
   a device for adjusting the polarization of said first and second modulated optical signals to have first and second substantially orthogonal polarization states, respectively.

14. The apparatus according to claim 13, wherein said transmitter further includes a combiner for combining said first and second modulated optical signals having said first and second substantially orthogonal polarization states to provide said optical input signal.

15. The apparatus according to claim 12, wherein said receiver comprises:
   a separator for separating said optical output signal into first and second optical output signals that have the third and fourth substantially orthogonal polarization states, respectively; and
   said converter converts said first and second optical output signals to first and second RF output signals that correspond to the third and fourth substantially orthogonal polarization states, respectively.

16. The apparatus according to claim 15, wherein said comparator compares each of said first and second RF output signals with reference signals at said first and second RF frequencies to provide said four phase shift and amplitude measurements.

17. The apparatus according to claim 16, wherein said comparator comprises a plurality of RF mixers.

18. The apparatus according to claim 13, wherein said tunable optical source comprises a tunable narrow band laser.

19. The apparatus according to claim 12, wherein said at least one optical property includes at least one of chromatic dispersion, polarization dependent dispersion, insertion loss, transmittance, reflectance, polarization dependent loss, polarization dependent reflectance, group delay and differential group delay.

20. A method for determining chromatic dispersion and polarization dependent dispersion of an optical device, comprising:
   splitting an optical signal from a tunable optical source into first and second optical signals,
   modulating said first and second optical signals at first and second RF frequencies, respectively, to provide first and second modulated optical signals;
   adjusting a polarization of said first and second modulated optical signals to provide first and second modulated optical signals that have first and second polarization states, respectively;
   combining said first and second modulated signals having said first and second polarization states to provide an optical input signal;
   passing said optical input signal to an optical device;
   separating an optical output signal from said optical device into first and second optical output signals that have third and fourth polarization states, respectively;
   converting said first and second optical output signals to first and second RF output signals that correspond to the third and fourth polarization states, respectively; and
   comparing each of said first and second RF output signals with RF reference signals at said first and second RF frequencies to provide four phase shift and amplitude measurements from which the chromatic dispersion and the polarization dependent dispersion of the optical device can be determined as a function of wavelength as said optical signal from said tunable optical source is tuned to different wavelengths.

* * * * *